(12) United States Patent
Barrow

(10) Patent No.: US 7,844,256 B1
(45) Date of Patent: Nov. 30, 2010

(54) ENABLING DISPATCH CALLS FOR LONG-DISTANCE-RESTRICTED SUBSCRIBERS

(75) Inventor: Steven Barrow, Riding, VA (US)

(73) Assignee: Nextel Communications Inc., Reston, VA (US)

( * ) Notice: Subject to any disclaimer, the term of this patent is extended or adjusted under 35 U.S.C. 154(b) by 1069 days.

(21) Appl. No.: 11/588,593

(22) Filed: Oct. 27, 2006

(51) Int. Cl.
*H04M 3/16* (2006.01)
(52) U.S. Cl. ...................... 455/411; 455/518
(58) Field of Classification Search .......... 455/518, 455/519, 406, 404.2, 432.1, 411
See application file for complete search history.

(56) References Cited

U.S. PATENT DOCUMENTS 6,405,050 B1 * 6/2002 Amirijoo et al. ............ 455/518
2006/0072517 A1 * 4/2006 Barrow et al. .............. 370/335

* cited by examiner

*Primary Examiner*—Tu X Nguyen

(57) ABSTRACT

A dispatch call request is received from a calling party to make an inter-urban dispatch call to a called party over a telecommunications network. A determination is first made as to whether the calling party is restricted from making inter-urban calls and, if so, a determination is then made as to whether the called party is an unrestricted access subscriber. In one embodiment, the dispatch call will be connected to the called party when the calling party is restricted from making inter-urban calls and the called party is an unrestricted access subscriber.

22 Claims, 3 Drawing Sheets

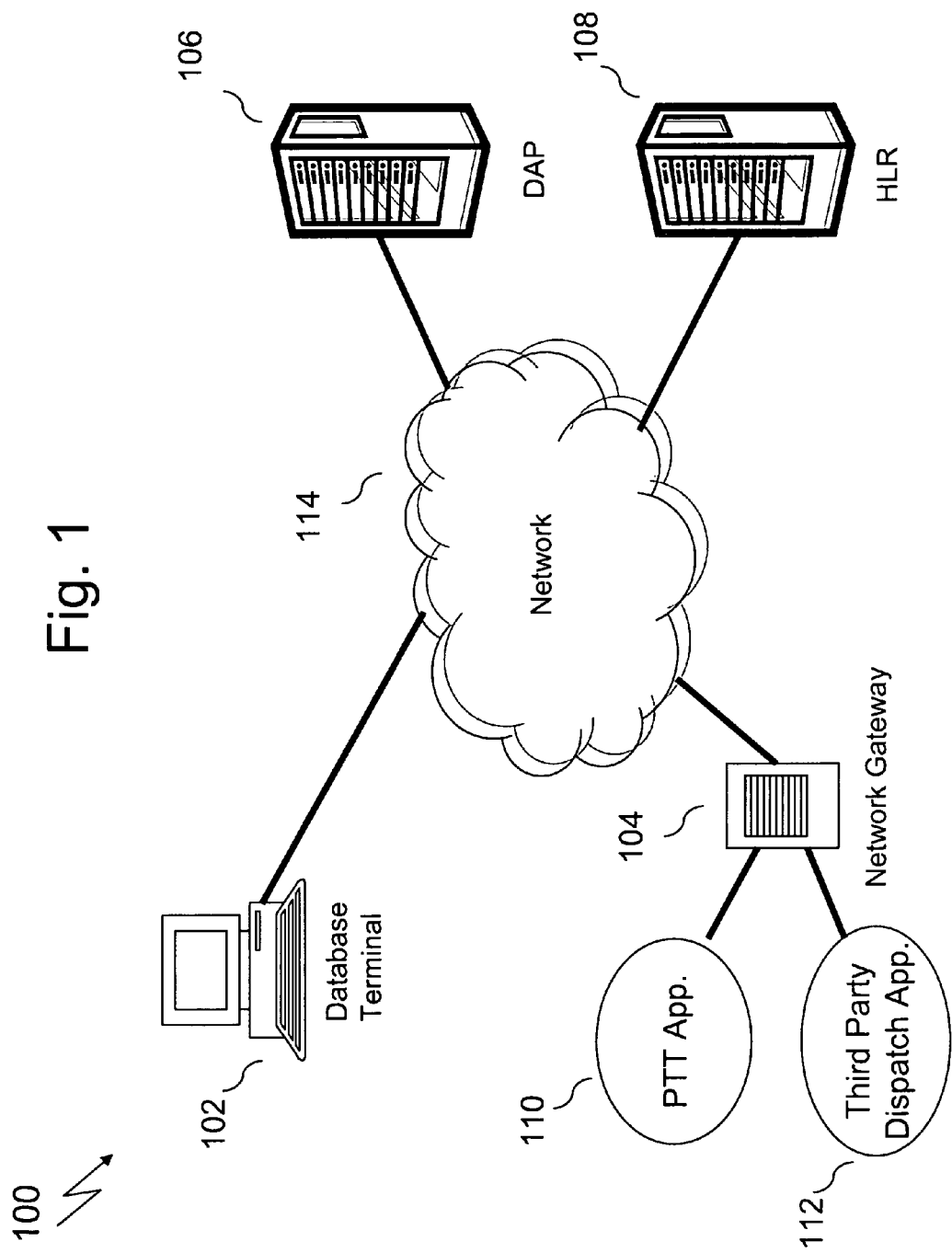

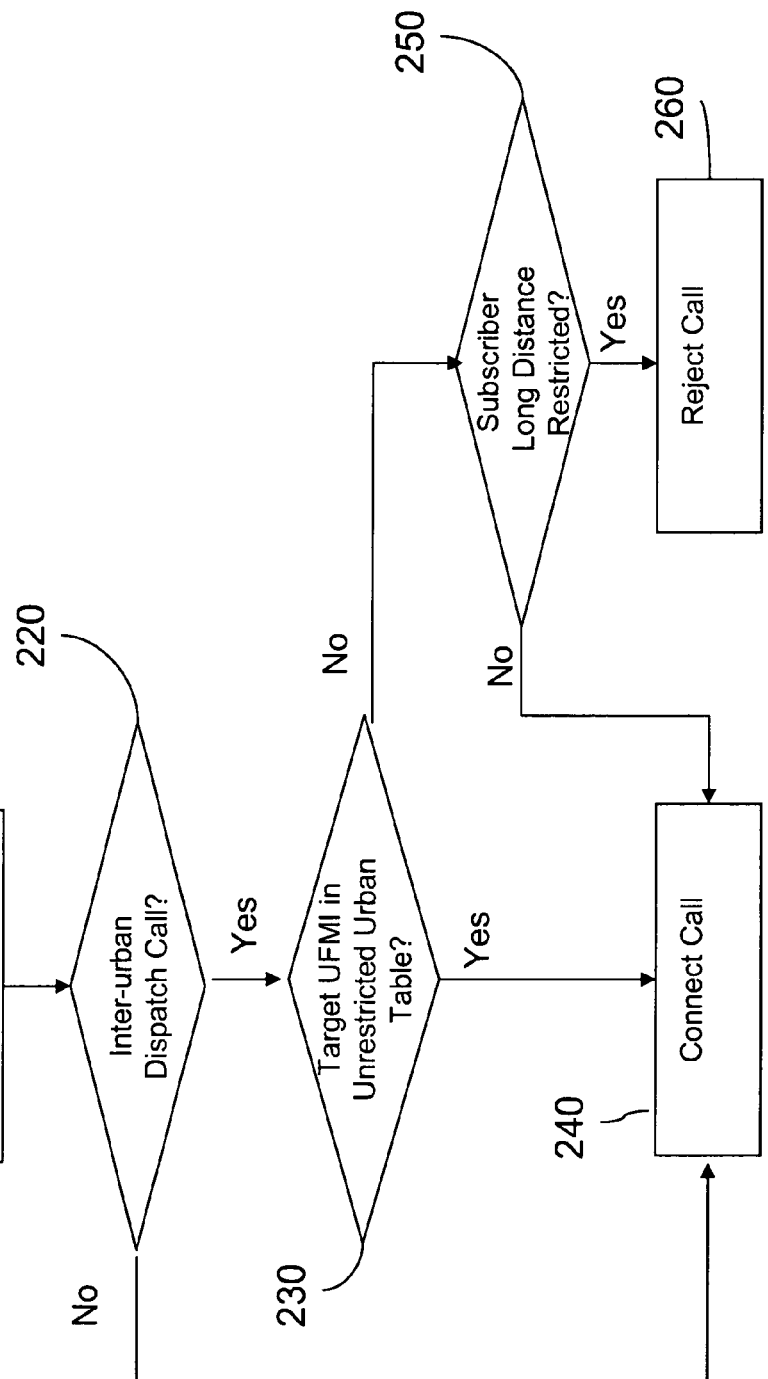

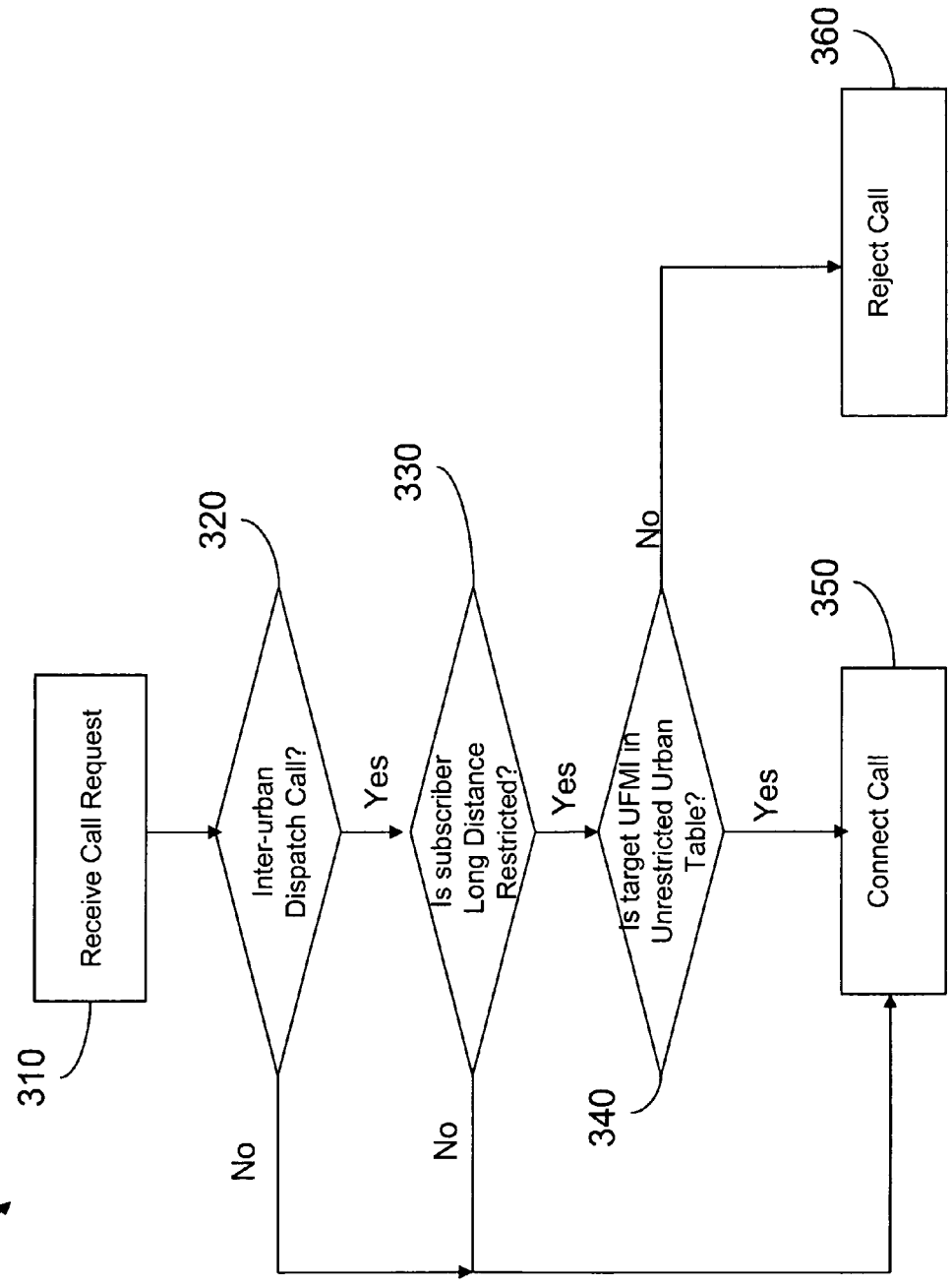

ENABLING DISPATCH CALLS FOR LONG-DISTANCE-RESTRICTED SUBSCRIBERS

FIELD OF THE INVENTION

The present invention relates generally to the field of telecommunication systems, and in particular to enabling inter-urban dispatch calls to be made by long-distance-restricted subscribers.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly implemented as a push-to-talk (PTT) type of service, such as the dispatch call service marketed by Sprint Nextel Corporation under the trade name Direct Connect. PTT services have been implemented using the Integrated Digital Enhanced Network (iDEN™), which provides functionality for individual half-duplex transmissions to be sent to another party on the system without needing a connection to be already established. Other iDEN PTT services include Selective Dynamic Group Call (SDGC), Private Call (PC) and Dispatch to Desktop (D2D), etc.

Dispatch communications are based on dispatch regions or markets, which are large geographic areas serviced by a single provider. If a service provider has adjacent or overlapping markets they may be linked to provide contiguous service across urban areas. Inter-urban calls are dispatch calls that occur between two different dispatch markets—for example, a dispatch call between an iDEN user in New York and another iDEN user located in Los Angeles. Conversely, an intra-urban call is a dispatch call that occurs within a single dispatch market.

A problem arises on some networks for subscribers who are restricted from making inter-urban calls. Such subscribers may, for example, be restricted based on the selection of a service plan that does not include long-distance service. Under the current implementation of iDEN, for example, long-distance restricted subscribers are unable to make PTT calls to users that are on other PTT networks (i.e., High-performance PTT (HPPTT on CDMA) or other PTT applications (i.e., push-to-weather, push-to-sports, etc.) because iDEN networks, by design, treat all dispatch calls that get routed through the iDEN gateway (iGW) as calls from a different dispatch market, and are hence as inter-urban calls (i.e., long-distance dispatch calls). Thus, there is a need to enable dispatch callers who have restrictions on making long-distance dispatch calls to be able to make inter-urban dispatch calls, such as dispatch calls routed through the iDEN gateway.

SUMMARY OF THE INVENTION

Disclosed and claimed herein are systems and methods for enabling long-distance restricted users to make dispatch calls over a telecommunications network. In one embodiment, a method includes receiving a request from a calling party to make an inter-urban dispatch call to a called party over a telecommunications network. The method further includes determining if the calling party is restricted from making inter-urban calls, and determining whether the called party is an unrestricted access subscriber. The method finally includes connecting the dispatch call to the called party when the calling party is restricted from making inter-urban calls, and when the called party is an unrestricted access subscriber.

Other objects, advantages and novel features of the present invention will become apparent from the following detailed description of the invention when considered in conjunction with the accompanying drawings.

BRIEF DESCRIPTION OF THE DRAWINGS

FIG. 1 illustrates a system for implementing one embodiment of the invention;

FIG. 2 illustrates a process for implementing one embodiment of the invention; and FIG. 3 illustrates another process for implementing a second embodiment of the invention.

DETAILED DESCRIPTION OF THE EXEMPLARY EMBODIMENTS

Disclosed and claimed herein is a system and method for enabling inter-urban dispatch calling for long-distance restricted subscribers. As described herein, intra-urban dispatch calls refer to calls that originate and terminate within a single dispatch region, which is a geographic area that is served by the same PTT server. Similarly, inter-urban dispatch calls are calls that originate in one dispatch region, but terminate in a different dispatch region. As used herein, the term "dispatch communication" or "dispatch call" refers generically to any PTT service, including HPPTT, SDGC, PC, D2D, etc. In addition, dispatch calls that are routed through some network gateways (e.g., iGW of an iDEN network) will automatically be treated as an inter-urban call.

In certain embodiments, a telecommunications network in accordance with the invention receives a request from an originating subscriber to make a inter-urban dispatch call over the telecommunications network. Heretofore, the network would not connect the call if the originating subscriber was a long-distance restricted customer. Thus, one aspect of the invention is to provide inter-urban dispatch call functionality to a long-distance restricted subscriber where the called party is an unrestricted access subscriber.

Once a call request is received, the network may first determine if the request is for an inter-urban call. The network may then determine if the originating subscriber is restricted from making inter-urban calls and, if so, then determine whether the called party is an unrestricted access subscriber. In certain embodiments, the dispatch call will be connected to the called party despite the originating subscriber being restricted from making inter-urban calls when the called party is an unrestricted access subscriber.

In one embodiment, the originating subscriber will be considered restricted from making inter-urban calls when the originating subscriber has long-distance-restricted service. The determination as to whether the originating subscriber has long-distance-restricted service may be made by checking a flag associated with the call request.

In certain embodiments, the aforementioned determination as to whether the called party is an unrestricted access subscriber may include comparing a subscriber ID for the called party to a list of unrestricted access subscribers. In one embodiment, the subscriber ID is a Universal Fleet Member ID, and the list of unrestricted access subscribers is contained in an Unrestricted Urban Table stored in a dispatch application processor of the telecommunications network.

In accordance with the practices of persons skilled in the art, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

FIG. 1 illustrates an embodiment of a system 100 in which the invention may be implemented. As shown, a PTT application server 110 or a third-party dispatch application 112 (e.g., D2D) executing on a subscriber unit is connected through the physical layers into an network gateway 104 (e.g., iGW) which connects into the network 114, which in one embodiment is an iDEN network. In addition to treating inter-urban dispatch calls as such, dispatch calls that are routed through the gateway 104 are processed as inter-urban calls, regardless of the geographic location of the originating dispatch subscriber and/or the target dispatch subscriber.

Also connected to the network 114 are Dispatch Application Processor (DAP) 106, database terminal 102 executing associated software and described in more detail below, and Home Location Register (HLR) 108—a central database containing subscriber services information. Dispatch calls are typically terminated and controlled by the DAP 106 which manages the establishment of the media link for the call, arbitrates floor control and media flow. Any new service creation related to call processing require corresponding modifications to the DAP software. Dispatch calls from one DAP to another are treated as dispatch calls, as are calls routed through the gateway 104.

In certain embodiments, database terminal 102 is an off-network database that contains, among other things Universal Fleet Member ID (UFMI) ranges for network subscribers and is responsible for downloading/updating UFMI ranges in the DAPs and HLRs in the network 114. As is generally known, each subscriber capable of dispatch calling has a unique identity number referred to as a UFMI. Dispatch services, limitations and provisioning are specified by Fleet ID, Group ID and the UFMI. In addition, the database terminal 102 may contain a Unrestricted Urban Table (UTT), which is a list of subscribers and/or Universal Fleet Member ID (UFMI) ranges that are granted unrestricted access across urban boundaries. Examples of such subscribers may include UFMI ranges for users of HPPTT on CDMA, or third-party dispatch applications (e.g., third-party dispatch application 112). This table, which is may be regularly updated, is a part of a standard Global Translation Table typically pushed to all DAPs and HLRs in an network. In one embodiment, this updating may be done by the database terminal 102. As is generally known, a global title is an application address, such as an 800 number, calling card number, or a mobile subscription number. Global title translation is the process by which a global title is translated into the point code and subsystem number of the destination service switching point where higher layer protocol processing occurs. The results of this translation process are then stored in the aforementioned Global Translation Table.

Referring now to FIG. 2, depicted is one embodiment of a process 200 for carrying out the invention. Process 200 begins when a call request is received from a calling party at block 210 (e.g., by DAP 106). A determination may then be made at block 220 as to whether the call is an inter-urban call or not. In one embodiment, the call may be considered inter-urban if it originated in one dispatch region, but would terminate in a different dispatch region. The call may similarly be treated as an inter-urban dispatch call if the call was routed through a network gateway (e.g., network gateway 104).

If it is determined at block 220 that the requested call is not an inter-urban call, process 200 may continue to block 240 where the call will be connected in the normal course. If, on the other hand, the call is determined to be an inter-urban call, process 200 may then continue to block 230, at which point a determination may be made (e.g., by the DAP 106) as to whether the UFMI for the target dispatch subscriber is in the UTT.

If it is determined at block 230 that the target UFMI (or UFMI range) does indeed exist in the UTT, then the call is processed in the normal course at block 240 despite the fact that the call is considered an inter-urban call and that the calling party may be long-distance restricted. If, on the other hand, the target UFMI (or UFMI range) is not an entry in the UTT, process 200 continues to block 250 where a further determination may be as to whether the calling party is long-distance restricted. In one embodiment, this may be done by examining a long-distance-restriction flag associated with the call request of block 210.

Continuing to refer to FIG. 2, if it is determined at block 250 that the calling party is long-distance restricted, process 200 may continue to block 260 where the dispatch call is rejected per the typical treatment of a dispatch call for a long-distance restricted party. If, on the other hand, it is determined at block 250 that the calling party is not long-distance restricted, process 200 may continue to block 240 where the call is process in the normal course.

Referring now to FIG. 3, depicted is another embodiment of a process 300 for carrying out the invention. In this embodiment, process 300 begins when a dispatch call request is received from a calling party at block 310 (e.g., by DAP 106). As with process 200, process 300 must then determine if the call is an inter-urban call at block 320. In one embodiment, the call may be considered inter-urban if it originated in one dispatch region, but would terminate in a different dispatch region. The call may similarly be treated as an inter-urban dispatch call if the call was routed through a network gateway (e.g., network gateway 104).

If the dispatch call request is not an inter-urban, process 300 may continue to block 350 where the call is connected in the normal course. If, on the other hand, the dispatch call is considered an inter-urban call, then process 300 may continue to block 330, where a determination may be made as to whether the calling party is a long-distance-restricted subscriber.

If it is determined at block 330 that the calling party is not long-distance restricted, process 300 may continue to block 350 where the call is process in the normal course. If, on the other hand, the calling party is long-distance restricted, process 300 may then continue to block 340, where a determination is made as to whether the UFMI (or UFMI range) for the target dispatch subscriber is in the previously-described UTT. If the target subscriber is listed in the UTT, process 300 may continue to block 350 where the call will be processed in the normal course despite the calling part being a long-distance-restricted subscriber and the call being considered an inter-urban call. If, on the other hand, the target subscriber is not listed in the UTT, process 300 may continue to block 360 where the dispatch call is rejected per the typical treatment of a dispatch call for a long-distance restricted party.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A method comprising the acts of:
    receiving a request from a calling party to make an inter-urban dispatch call to a called party over a telecommunications network;
    determining if a calling party is restricted from making inter-urban calls;
    determining if the called party is an unrestricted access subscriber; and
    connecting said dispatch call to the called party when the calling party is restricted from making inter-urban calls, and when the called party is an unrestricted access subscriber.

2. The method of claim 1, further comprising determining that the dispatch call is an inter-urban call when the dispatch call is routed through a network gateway of the telecommunications network.

3. The method of claim 1, further comprising determining that the dispatch call is an inter-urban call when the called party is in a different dispatch region than the calling party.

4. The method of claim 1, wherein determining if the calling party is restricted from making inter-urban calls comprises determining if the calling party has long-distance-restricted service.

5. The method of claim 1, determining if the calling party is restricted from making inter-urban calls comprises checking a flag associated with said request.

6. The method of claim 1, wherein determining if the called party is an unrestricted access subscriber comprises comparing a subscriber ID for the called party to a list of unrestricted access subscribers.

7. The method of claim 6, wherein the subscriber ID is a Universal Fleet Member ID.

8. The method of claim 6, wherein comparing the subscriber ID to the list of unrestricted access subscribers comprises comparing a Universal Fleet Member ID for the called party to an Unrestricted Urban Table stored in a dispatch application processor of the telecommunications network.

9. A method comprising the acts of:
    receiving a request from a long-distance-restricted subscriber to make a dispatch call to a called party over a telecommunications network;
    identifying the dispatch call as an inter-urban call;
    determining if the called party is an unrestricted access subscriber; and
    connecting the dispatch call to the called party when the called party is an unrestricted access subscriber.

10. The method of claim 9, wherein identifying comprises identifying the dispatch call as being inter-urban when the dispatch call is routed through a network gateway of the telecommunications network.

11. The method of claim 9, wherein identifying comprises identifying the dispatch call as being inter-urban when the called party is in a different dispatch region than the long-distance-restricted subscriber.

12. The method of claim 9, wherein determining if the called party is an unrestricted access subscriber comprises comparing a subscriber ID for the called party to a list of unrestricted access subscribers.

13. The method of claim 12, wherein the subscriber ID is a Universal Fleet Member ID.

14. The method of claim 12, wherein comparing the subscriber ID to the list of unrestricted access subscribers comprises comparing a Universal Fleet Member ID for the called party to an Unrestricted Urban Table stored in a dispatch application processor of the telecommunications network.

15. A system comprising:
    a telecommunications network;
    an originating subscriber unit in communication with the telecommunications network, the originating subscriber unit to transmit an inter-urban dispatch call request to the telecommunications network; and
    a target subscriber unit in communication with the network, wherein the telecommunications network, upon receiving the dispatch call request, is configured to,
        determine if the originating subscriber is restricted from making inter-urban calls,
        determine if the target subscriber unit is an unrestricted access subscriber unit, and
        connect said dispatch call to the target subscriber unit when the originating subscriber is restricted from making inter-urban calls and the target subscriber unit is an unrestricted access subscriber unit.

16. The system of claim 15, wherein the telecommunications network is further configured to determine that the dispatch call is an inter-urban call when the dispatch call is routed through a network gateway of the telecommunications network.

17. The system of claim 15, wherein the telecommunications network is further configured to determine that the dispatch call is an inter-urban call when the target subscriber unit is in a different dispatch region than the originating subscriber unit.

18. The system of claim 15, wherein the telecommunications network is further configured to determine that the originating subscriber unit is restricted from making inter-urban calls when the originating subscriber unit has long-distance-restricted service.

19. The system of claim 15, wherein the telecommunications network is further configured to determine that the originating subscriber unit is restricted from making inter-urban calls by checking a flag associated with said request.

20. The system of claim 15, wherein the telecommunications network is further configured to determine that the target subscriber unit is an unrestricted access subscriber by comparing a subscriber ID for the target subscriber unit to a list of unrestricted access subscribers.

21. The system of claim 20, wherein the subscriber ID is a Universal Fleet Member ID.

22. The system of claim 20, wherein the subscriber ID is a Universal Fleet Member ID and the list of unrestricted access subscribers is an Unrestricted Urban Table stored in a dispatch application processor of the telecommunications network.

* * * * *